No. 789,544. PATENTED MAY 9, 1905.
L. HOUSE.
VEHICLE BRAKE.
APPLICATION FILED AUG. 17, 1904.

4 SHEETS—SHEET 1.

WITNESSES:
L. H. Fulmer.
J. J. Laass

INVENTOR
Louis House
By E. Laass
ATTORNEY.

No. 789,544. PATENTED MAY 9, 1905.
L. HOUSE.
VEHICLE BRAKE.
APPLICATION FILED AUG. 17, 1904.
4 SHEETS—SHEET 3.
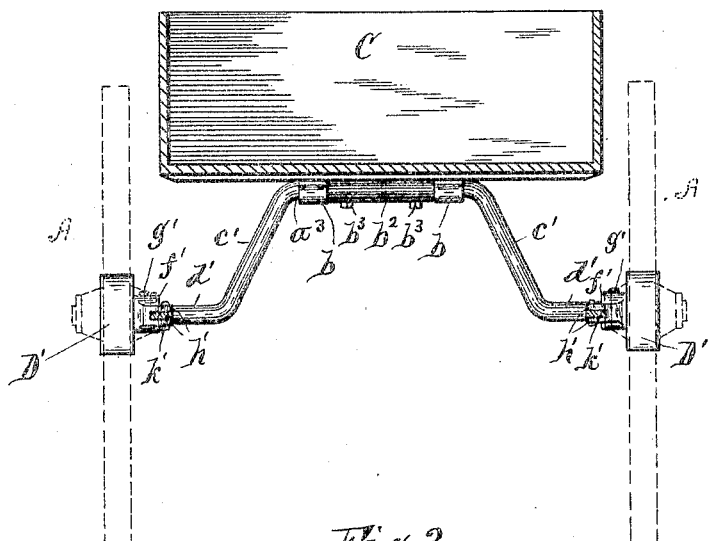
Fig. 3
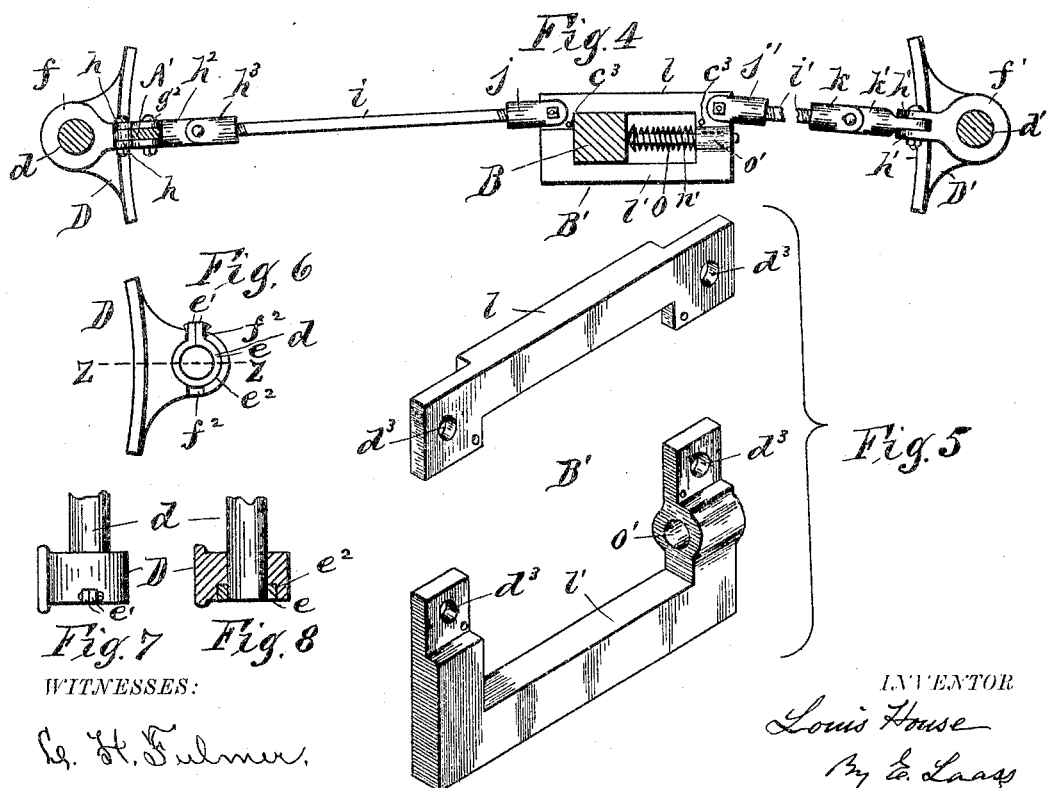
WITNESSES:
INVENTOR
Louis House
By E. Laass
ATTORNEY.

No. 789,544. PATENTED MAY 9, 1905.
L. HOUSE.
VEHICLE BRAKE.
APPLICATION FILED AUG. 17, 1904.
4 SHEETS—SHEET 4.

WITNESSES:
D. H. Fulmer.
J. J. Laass.

INVENTOR
Louis House.
By E. Laass
ATTORNEY.

No. 789,544.

Patented May 9, 1905.

UNITED STATES PATENT OFFICE.

LOUIS HOUSE, OF SYRACUSE, NEW YORK.

VEHICLE-BRAKE.

SPECIFICATION forming part of Letters Patent No. 789,544, dated May 9, 1905.

Application filed August 17, 1904. Serial No. 221,006.

*To all whom it may concern:*

Be it known that I, LOUIS HOUSE, of Syracuse, in the county of Onondaga, in the State of New York, have invented new and useful Improvements in Vehicle-Brakes, of which the following, taken in connection with the accompanying drawings, is a full, clear, and exact description.

This invention relates to the class of vehicle-brakes shown and described in my Letters Patent No. 721,446, issued February 24, 1903, and in my application for patent filed November 14, 1903, Serial No. 181,148.

The main object of the present invention is to produce a brake mechanism which shall be particularly adapted for vehicles which are designed to carry heavy loads, more especially those which are required to be drawn over hilly roads.

Furthermore, the object of the invention is to produce a brake of the aforesaid character which shall be simple, strong, and durable in construction, efficient and reliable in its operation, inexpensive to manufacture, and can be readily applied to a vehicle and removed therefrom when required and at the same time shall be compact and also present a neat appearance.

To that end the invention consists in the novel arrangement and combination of the component parts of the brake, as hereinafter fully described, and set forth in the claims.

Figure 1:
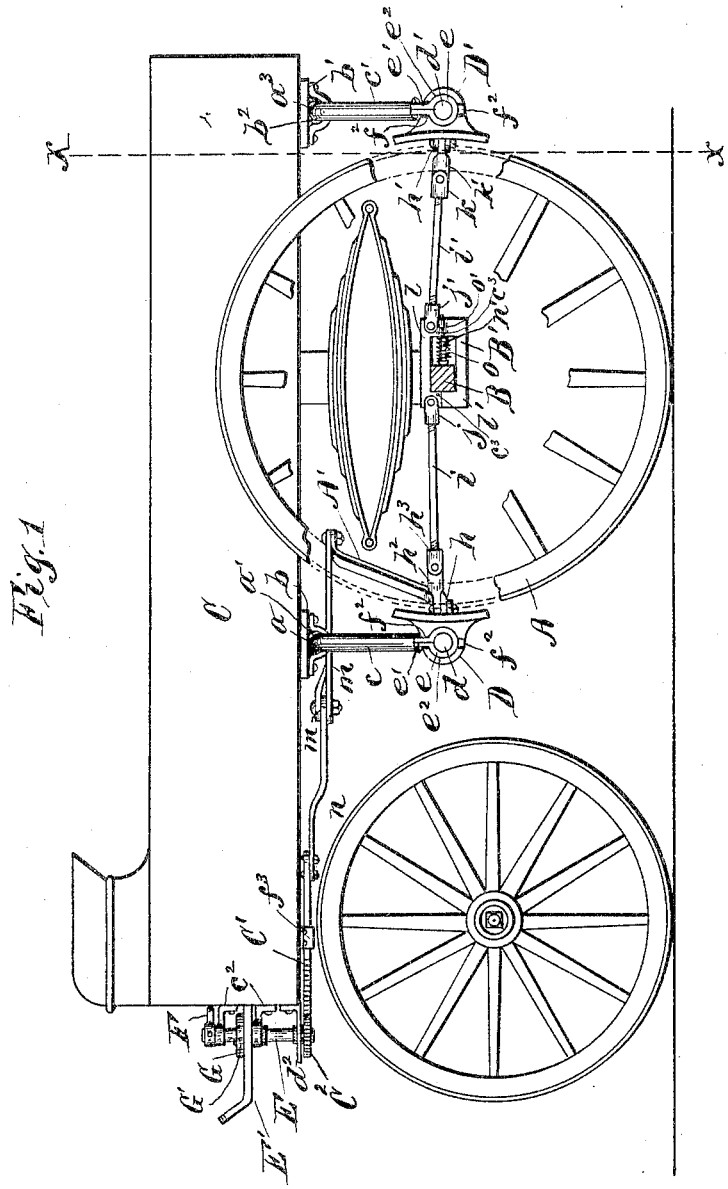
Figure 2:
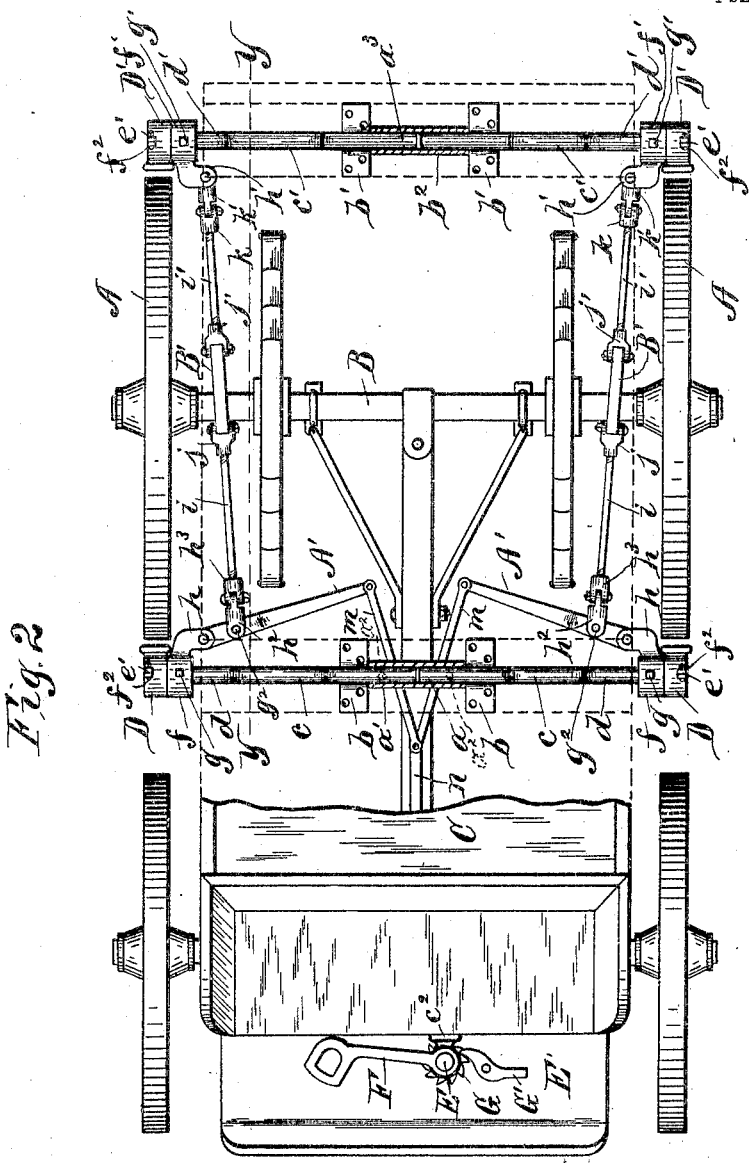
Figure 9:
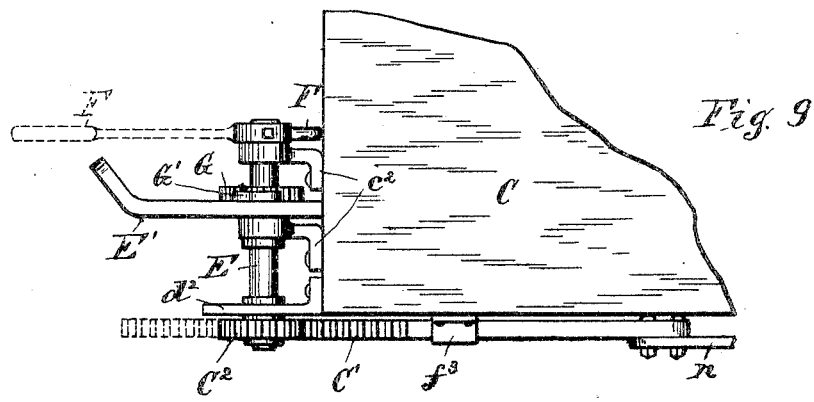
Figure 10:
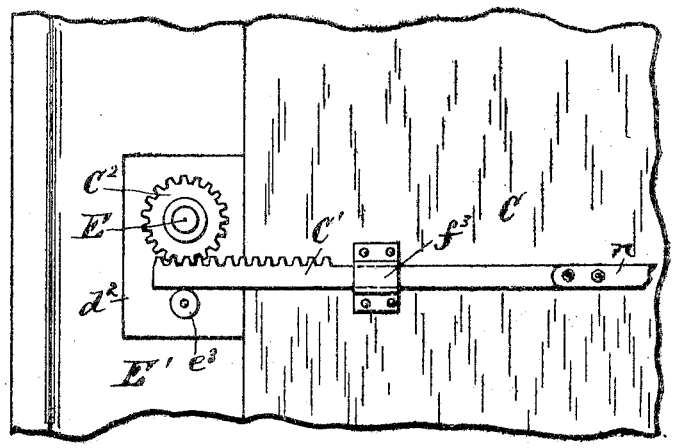
Figure 11:
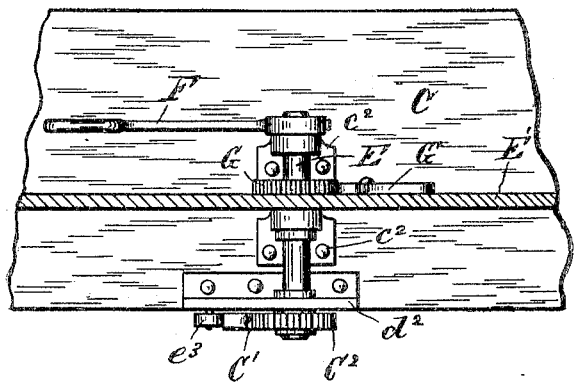

In the accompanying drawings, Figure 1 is a side view of a vehicle equipped with my improved brake, the rear wheels being broken away. Fig. 2 is a plan view, the rear portion of the body being broken away and indicated by dotted lines. Fig. 3 is a vertical transverse section taken on the dotted line X X in Fig. 1 and viewed toward the rear. Fig. 4 is an enlarged longitudinal section taken on the dotted line Y Y in Fig. 2 minus the wheel and showing more clearly the link connections of the brake-rods. Fig. 5 is a further enlarged perspective view of the detached plates of which the link is composed. Fig. 6 is an enlarged side view of one of the brake-shoes. Fig. 7 is a plan view of the same. Fig. 8 is a transverse section taken on the dotted line Z Z in Fig. 6. Fig. 9 is an enlarged detail side view of the front portion of the vehicle-body and showing more clearly the manually-operated device for actuating the brake-levers. Fig. 10 is an enlarged inverted plan view of the same and showing more clearly the rack-and-pinion mechanism thereof, and Fig. 11 is a front view.

Similar letters of reference indicate corresponding parts.

A A denote the rear wheels of the vehicle, and B the axle thereof, upon which the body C is mounted in the well-known manner.

$a$ represents a cross-bar which is disposed in front of the rear wheels and is pivotally supported on the under side of the body C by means of suitable boxes $b\ b$, whereby the bar is permitted to oscillate. The said bar is bent downward to form hangers $c\ c$, which terminate with lateral outward extensions $d\ d$. D D denote brake-shoes, which are mounted on said extensions $d\ d$ and may be of any suitable form and secured thereon in any convenient manner. This cross-bar $a$ is composed of two sections, which are embraced by a sleeve $a'$, provided with set-screws $a^2\ a^2$, passing through the same and engaging the sections, whereby the latter are rigidly united. By this arrangement the said bar-sections can be shifted longitudinally, so as to adjust the shoes D D in relation to the wheel when required.

$a^3$ denotes a cross-bar which is pivotally supported on the body C by means of boxes $b'\ b'$ and is disposed back of the wheels A A. This cross-bar $a^3$ is formed with hangers $c'\ c'$, which terminate with lateral extensions $d'\ d'$, and on these extensions are mounted brake-shoes D' D'. Said cross-bar $a^3$ is likewise composed of two sections united by a sleeve $b^2$, provided with set-screws $b^3\ b^3$, whereby the sections can be shifted for the purpose set forth.

On the front extensions $d\ d$ are mounted collars $f\ f$, which may be fastened thereto in any suitable manner, preferably by means of set-screws $g\ g$. These collars $f\ f$ abut against the brake-shoes D D, and thus prevent the latter from shifting inwardly on the extensions, and each of said collars is formed with a pair of ears $h\ h$, projecting rearwardly. On the rear extensions $d'$ $d'$ are mounted similar collars $f'$ $f'$, fastened thereto by means of set-screws $g'$ $g'$ and which abut against the brake-shoes D' D' and prevent the latter from shifting, as aforesaid. Each of these collars $f'$ is formed with forwardly-projecting ears $h'$ $h'$ for the purpose hereinafter explained.

To prevent the brake-shoes D D D' D' from shifting outwardly on the hangers, I provide the extensions with collars or bands $e$ $e$, which are formed with clamping-ears $e'$ $e'$, whereby they are securely held thereon. These collars or bands $e$ $e$ are seated in annular recesses $e^2$ $e^2$, formed in the hubs of the shoes, and the said ears project through notches $f^2$ $f^2$, communicating with said recesses, as clearly shown in Figs. 6, 7, and 8 of the drawings. By providing the brake-shoes with two oppositely-disposed notches, as shown, they are rendered interchangeable.

A' A' represent levers which are pivoted at one end between the ears $h$ $h$ of the respective collars $f$ $f$ and which extend toward each other and are normally disposed convergent toward the rear, as clearly shown in Fig. 2 of the drawings. To each of said levers A', adjacent to the collar $f$, is pivotally connected a rod $i$ by means of suitable couplings $h^2$ $h^3$, which rod extends rearwardly therefrom and is provided at its rear end with a suitable coupling $j$, by which it is pivotally connected to the forward end of a link B', mounted longitudinally movable on the rear axle B. To the opposite end of each of the links B' is pivotally connected a rod $i'$ by means of a like coupling $j'$. These latter rods $i'$ $i'$ extend rearwardly from the links and are each provided with couplings $k$ $k'$ at the rear end, by which they are pivotally connected to the ears $h'$ $h'$ of the collars $f'$ $f'$, mounted on the rear hanger extensions $d'$ $d'$. At the connections of the couplings $j$ $j'$ and aforesaid links and the connections of the couplings $k$ $k'$ and $h^2$ $h^3$ I employ horizontally-disposed bolts, so as to relieve the same from torsional strain incident to the vertical movement of the vehicle-body due to the traveling of the vehicle over rough roads and at the same time allow the body to assume different elevations caused by the different weights of the loads carried thereby.

To the free end of each of the aforesaid levers A' is pivotally connected one end of a forwardly-extending arm $m$, which arms are pivotally connected at their opposite ends to a longitudinal rod $n$, extending to the front end of the vehicle-body. To the front end of the rod $n$ is rigidly fastened a rack C', which engages a pinion $C^2$, fastened to the lower end of a vertical revoluble post E, which is journaled in suitable brackets $c^2$ $c^2$, secured to the front end of the body C. This post passes through the footboard E', and to the upper end of said post is rigidly fastened a suitable foot-lever F. Said post also passes through a horizontally-disposed plate $d^2$, fastened to the body above the aforesaid pinion $C^2$, to which plate is pivoted a roller $e^3$, which bears against the rack C' to retain the latter in its engagement with the pinion. To the bottom of the vehicle-body C is secured a suitable guide $f^3$, in which the said rack slides.

The forward movement of the foot-lever F rotates the pinion $C^2$, whereby the rack draws the rod $n$ forward, and thus the aforesaid levers A' A' are actuated to cause the rods $i$ $i'$ and links B' B' to primarily swing the rear hangers $c'$ $c'$ forward, and thereby draw the brake-shoes D' D' into contact with the wheels. This engagement of the brake-shoes limits the forward movement of said rods, thereby producing fulcrums on the rods $i$ $i$, as indicated at $g^2$, and thus by the continued movement of the foot-lever the levers A' A' are caused to swing the front hangers $c$ $c$ rearward to carry the brake-shoes D D into contact with said wheels.

I prefer to employ a lock in connection with the brake mechanism for maintaining the brake-shoes in their braking positions and which is very desirable in instances when the driver of the vehicle is required to dismount while ascending or descending a steep hill. This lock also enables the driver to leave the horse or team attached to the vehicle without the necessity of hitching the same, thereby affording safety and convenience. This lock consists of a ratchet-wheel G, rigidly fastened to the aforesaid post E, and a dog $G^2$, pivoted to the footboard and engaging said ratchet-wheel, as clearly shown in Figs. 2, 9, and 11 of the drawings. When the ratchet-wheel is released from the dog and the foot-lever F is moved rearward, the levers A' A' are caused to draw the front brake-shoes D D to their normal positions. This movement of the foot-lever relieves the rods $i$ $i$ $i'$ $i'$ and connecting-links B' B' from forward draft, whereby the rear brake-shoes are forced to like positions by means of spiral springs $o$ $o$, surrounding pins $n'$ $n'$, supported longitudinally movable on the links B' B', which springs bear with their ends against the rear side of the axle B and rear portions of the links and shift the latter rearward. The said links are each formed with an eye $o'$, which serves as a guide through which the pin $n'$ passes, as more clearly shown in Figs. 4 and 5 of the drawings. In order to permit the link B' to be readily applied to and removed from the axle, I form the said link of two plates $l$ $l'$, one of which is preferably shouldered on the other, and firmly unite the same by means of bolts or pins $c^3$ $c^3$, passing through the plates. These plates are provided with coinciding apertures $d^3$ $d^3$ for the reception of the bolts by which the aforesaid couplings $j$ $j'$ are connected thereto, as clearly shown in Fig. 5.

I do not limit myself to the devices employed for actuating the brake-levers nor to the lock device, inasmuch as other means may be substituted therefor. Neither do I limit myself to the specific construction of these devices, for the reason that the same are subject to various modifications without departing from the spirit of the invention.

What I claim as my invention is—

1. A vehicle-brake comprising two pairs of suitably-supported brake-shoes disposed at the front and rear of the rear wheels respectively, members supported slidably on the axle thereof, means connecting the shoes to said members, and means for moving said shoes into and out of contact with the wheels as set forth.

2. A vehicle-brake comprising two pairs of hangers supported movably on the vehicle-body and disposed respectively in front and back of the rear wheels, brake-shoes carried on said hangers, a pair of levers pivoted to the front hangers, longitudinally-sliding members supported on the axle, rods connecting said levers to said sliding members, rods connecting said members to the rear hangers, and means for operating said levers as set forth.

3. A vehicle-brake comprising two pairs of hangers supported movably on the vehicle-body and disposed respectively in front and back of the rear wheels, brake-shoes carried on said hangers, a pair of suitably-operated levers pivoted to the front hangers, rods extending rearwardly from said levers, rods extending forwardly from the rear hangers, and links connecting said front and rear rods and supported longitudinally movable on the rear axle as set forth.

4. A vehicle-brake comprising two pairs of hangers supported movably on the vehicle-body and disposed respectively in front and rear of the rear wheels, brake-shoes carried on said hangers, rods pivotally connected at one end to said hangers, links connecting the other ends of said rods and mounted slidably on the rear axle, suitably-operated levers connected to the forward rods, and springs supported on said links for the purpose set forth.

5. A vehicle-brake comprising a pair of cross-bars pivotally supported on the under side of the vehicle-body and disposed respectively in front and back of the rear wheels, hangers formed on said cross-bars and terminating with lateral outward extensions, brake-shoes carried on said extensions, collars mounted on the extensions, a pair of levers pivoted to the front collars, means for operating said levers, rearwardly-extending rods pivotally connected at one end to said levers, forwardly-extending rods pivotally connected to the rear collars, a pair of links mounted slidably on the rear axle and pivotally connected to the front and rear rods, pins loosely carried on said links, and spiral springs surrounding said pins and bearing with their ends against the axle and rear portions of the links for the purpose set forth.

6. A vehicle-brake comprising two pairs of hangers suitably supported in front and back of the rear wheels respectively, brake-shoes carried on said hangers, levers pivoted to the front hangers, members supported movably on the rear axle, means connecting said members to the said levers and to the rear hangers, and means for operating said levers, as set forth.

7. A vehicle-brake comprising a pair of hangers pivotally supported on the vehicle-body and disposed respectively in front and back of the rear wheels, brake-shoes carried on said hangers, a pair of levers pivoted to the front hangers, a pair of links mounted slidably on the rear axle, rods connecting the links with the levers and with the rear hangers, a rod connected at one end to said levers, a rack fastened to the opposite end of the latter rod, a vertical revoluble post supported on the front end of the body, a pinion fastened to the post and engaging said rack, a manually-operated lever fastened to the post, a ratchet-wheel also fastened to said post, and a dog suitably pivoted to the footboard of the body and arranged to engage said ratchet-wheel for the purpose set forth.

LOUIS HOUSE.

Witnesses:
J. J. LAASS,
L. H. FULMER.